C. A. AMBROSE.
BOG CUTTER, GRUBBER, AND WEEDER.
APPLICATION FILED APR. 11, 1921.
1,392,900.
Patented Oct. 11, 1921.
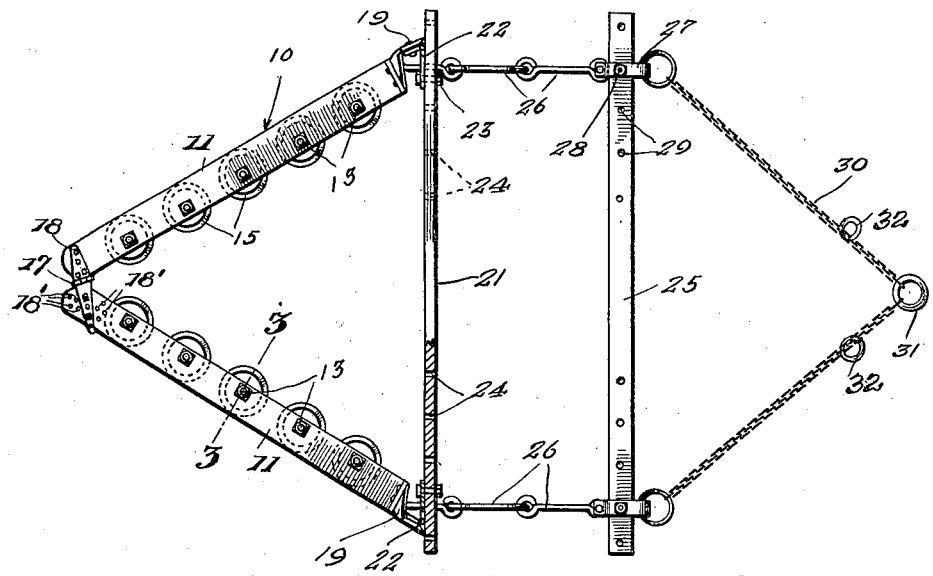
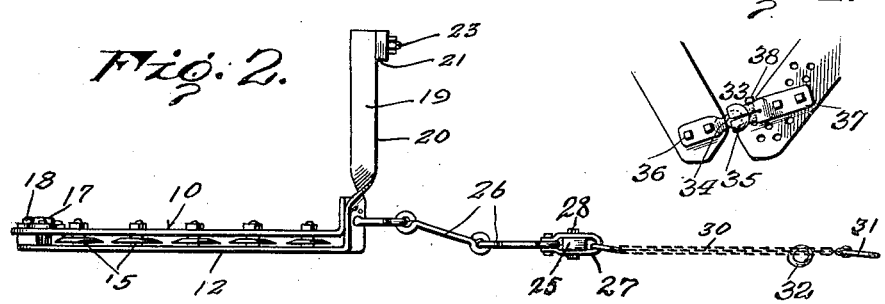
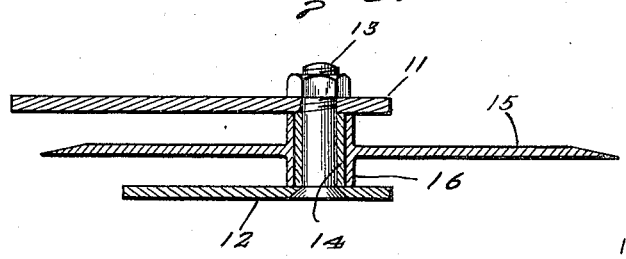
WITNESSES
R. O. Thomas
INVENTOR
C. A. Ambrose
BY
ATTORNEYS

UNITED STATES PATENT OFFICE.

CHARLES ALBERT AMBROSE, OF CARSON CITY, NEVADA.

BOG-CUTTER, GRUBBER, AND WEEDER.

1,392,900.

Specification of Letters Patent. Patented Oct. 11, 1921.

Application filed April 11, 1921. Serial No. 460,481.

*To all whom it may concern:*

Be it known that I, CHARLES ALBERT AMBROSE, a citizen of the United States, and resident of Carson City, in the county of Ormsby and State of Nevada, have invented certain new and useful Improvements in Bog-Cutters, Grubbers, and Weeders, of which the following is a specification.

This invention is an improved bog cutter, grubber and weeder being especially designed to cut weeds and water lilies in ditches, such as irrigating ditches employed in certain sections, and which become clogged up with weeds and lilies as stated, so that if the fall is not very great, the passage or flow of the water is prevented and the irrigation system rendered comparatively useless.

A further object of the invention is to provide a bog cutter, grubber and weeder which may be adjusted to ditches of different widths, and of different cross sectional forms, and which will efficiently cut the weeds and other foreign growth along the bottom and sides of the ditch, although it is to be understood that the device may be employed on level surfaces for cutting weeds or grub, or in boggy or wet spongy tracts of ground composed of decayed vegetable matter or marsh, so that the same may be effectively employed for irrigation, and farming purposes.

It is a still further object of the invention to provide a grubber and weeder which may be drawn along a ditch by two draft animals so as to cut and destroy the weeds and other growth as stated, and by which a ditch several miles long may be cleared of such growth in a comparatively short time, the ditch being allowed to contain a certain depth of water in order that the cut material may be floated off and washed down and out through a lateral or the end of the ditch. The device is designed to accomplish in a half a day what it would take a hundred men to do in most any other way within a day, and it consists of a novel and simple construction for the above purpose.

Other and further objects of my invention will become readily apparent to persons skilled in the art from a consideration of the following description when taken in conjunction with the accompanying drawings, wherein—

Figure 1 is a plan view of the improved bog cutter, grubber and ditch weeder.

Fig. 2 is a side elevation of the device,

Fig. 3 is an enlarged sectional view taken on the line 3—3 of Fig. 1 and showing the mounting of one of the cutting disks, and Fig. 4 is a sectional detail of another form of hinge connection for the frame members.

Referring to the drawings in detail, in which like reference characters designate corresponding parts throughout the several views, my improved bog cutter, grubber and ditch weeder consists of a relatively V-shaped frame 10 consisting of side members composed of spaced parallel upper and lower elongated rectangular plates or frame members 11 and 12. These plates are provided with a series of equi-distantly spaced apertures in registry vertically and receiving bolts 13 with interposed spacing means 14 on which are rotatably mounted a plurality of disks or bevel edged circular cutting blades 15, the hubs 16 of which serve to hold the cutting edges of the blades equi-distantly spaced between the upper and lower plates or frame members 11 and 12. As shown, the axles or pivots of the disks formed by the bolts 13 are disposed adjacent to the inner edges of said plates and thus the inner half portions or substantially so of the disks project inwardly while the outer portions are protected so that as the same are advanced along the ditch or ground, the separated ends of the frame members will travel foremost and cause the disks to turn or rotate by contact with the grub, weeds, water lilies and the like and will cut the latter, the turning of the disks reducing the friction and resistance to travel or transportation of the machine or implement against which the disks are positively projected, while there is comparatively no resistance against the outside edges of the frame members owing to the rearward convergence thereof.

The rear ends of the side members of the frame are connected in the relation specified, a hinge 17 being preferably employed for this purpose so that its pivot or pintle will be located longitudinally and centrally between the rear ends of said side members of the frame while the leaves thereof preferably extend outwardly and rearwardly and are bolted to the side members at a plurality of points, as indicated at 18, said side members each being provided with a plurality of apertures 18′ in order to permit angular adjustment of the side members, one with respect to the other, in order to vary the sweep of the device or the width and area encompassed by the cutting apparatus as the implement is advanced along the ditch or ground. The hinge will also permit the side members of the frame to adjust themselves to the concavity or curvature of the ditch, be the same rectangular or concaved and it will thus be insured that the weeds, or water lilies that grow so thick in ditches used to irrigate especially all through the West, and stop the current of water will be effectively cut off close to the ground surface and thereby insure a free flow of the water. In connection with the above, it may be pointed out that the weeds grow from three to four feet high and inasmuch as the lilies have a wide leaf that lies flat on the top of the water, it will be obvious that in some ditches the growth will be so thick that where there is but little fall, scarcely any water will flow and the head of water will become almost *nil* or nothing, thereby rendering the irrigating system useless. By removing the growth as stated, the ditch may be kept partly filled with water and the material that is cut off may be floated off with the water as the latter flows into the laterals, side gates, or at the end of the ditch.

At their forward ends, the lower plates of the side members of the frame 10 are provided with uprights 19, being formed integral with or attached to said plates, and twisted at their lower portions so as to be disposed in outwardly and forwardly extending planes, the forward edges or blades 20 thereof being sharpened to provide cutting edges whereby to sever and cut the weeds or other growth at the sides and especially at the sides of a ditch, in addition to forcing the weeds inwardly and downwardly to insure cutting thereof by the disks if not reached and cut by the blades formed with the uprights 19. These uprights are connected by a cross member 21, hinges or the like 22 being employed and having the leaves thereof connected to the upper ends of the uprights at the outside and the other leaves directed inwardly for connection at both bolts 23 through the cross member 21. This provides means for regulating the width of the device and especially the V-shaped frame, while each end of the cross member 21 is provided with a series of spaced apertures 24 extending horizontally from the front to the rear in order that the device may be adjusted from a minimum width of approximately two feet to a maximum width of eighteen feet or otherwise, according to the size, length and proportions of the parts. The cross member or bar 21 also serves to turn the weeds or other growth downwardly for action thereon by the cutting disks in conjunction with the vertical blades as stated.

A transverse draft bar 25 is connected to the frame members 11 and 12 through the medium of a flexible connection consisting of a series of links 26 disposed near each end and bolted through the apertures or other suitable openings provided for the purpose in the frame members or bars 11 and 12. The forward ends of the links or connections formed thereby extending from the frame 10 connect with clevises or flat loops 27 having spaced registering apertures for receiving bolts 28 by which connection is afforded through the bar 25, said bar having a series of spaced vertical apertures 29 at each end, preferably equidistantly spaced similar to the apertures 24 and in longitudinal alinement with respect thereto, in order that the width of the device may be regulated, in connection with the hitch or the drag chain 30, which at its rear end is connected to said clevis, as shown. The connection with the draft animals is made by means of the ring 31, and when the implement is advanced along the ground, the weeds, grub or other growth will be effectively cut off close to the ground. When the device is used in a ditch, the team will travel on one or both sides, that is with one draft animal on each side in order that the device may be advanced straight ahead but obviously any other suitable form of draft means may be employed or that the team can work in side of ditch in water ahead of machine. As the upright blades strike the weeds or water lilies, they will be directed inwardly and downwardly if not cut and will be subsequently cut by the disks 15. As before stated, the width of the frame 10 can be made as desired by varying the position of the bolts 23 in the cross member or bar 21 which is located so as to connect the upper ends of the uprights or blades 19 at a spaced distance from the ground and across the ditch when so used, as well as parallel to the ground surface, while the draft bar 25 drops to the ground normally but travels along the tops of the weeds slightly above the same when draft strain is exerted thereon by the hitch connection or chain. The connections 26 extending from the forward ends of the side members of the frame 10 serve in connection with the bolts 23 and the connections through the bolts 28 with the draft bar 25, to permit convenient, quick and wide adjustment of the width of the device, and thus the area covered in the operative action thereof. By this means, the growth can be effectively removed and in connection with ditches, the latter can be opened to insure a proper flow of water for irrigating purposes and in a quick and efficient manner. With a boy driving the team, a ditch several miles long may be cleared in a half a day and do as much at this particular work in a half a day as a hundred men can to in most any other way in a day, thus permitting the irrigating systems to be kept in a proper condition at a low upkeep cost. It is of course to be understood that a foot or two of water remains in the ditch while the device is in use, or afterward, in order that the weeds may be floated down and out at the end of the ditch to complete the operation. The device may be used in connection with a ditch of any size within its range and will fit the same, being preferably made to fit a ditch from two to twenty feet wide and of any height at the bank or any bottom, round or flat ditch or surface and yet efficiently cut and remove the weeds or other growth. An especial advantage resides in the fact that the frame is advanced toward its open end rather than at the closed end of the frame, that is moving in the direction which the sides diverge, rather than the direction in which said sides converge, the frame members or side arms serving to scatter and cut all of the weeds in its path rather than allowing the weeds to slip off as would occur if the device were advanced in the opposite direction. Furthermore, there is practically no resistance to the outside edges as it is thought will be readily apparent. The disks and blades serve to shear or cut the weeds off close to the surface or banks and as the weeds cannot escape, they are cut off in a positive and effective manner. Also by having only the inner portions of the disks exposed, they will turn instead of sliding, as would be the case if the entire disks were exposed, thus insuring a more positive cutting action and less resistance. Furthermore, the disks being covered at the top and bottom, they will be protected from injury, since the turning or revolving thereof assists in the discharge of material which would tend to clog and injure the cutting edges. In this manner the machine is kept clean of foreign matter and entanglement with weeds or other growth while the hinge connection between the arms or sides of the V-shaped frame allow the device to fit any ditch or to run over level ground in addition to permitting a variation of the width or sweep of the device. By having the uprights swiveled, the weeds are caused to rush in between the sides of the frame assisted by the water left in the ditch, which presses the weeds against the disks so as to cut them off and then fall over either side so as to float away. If so desired, the operator may adjust the sides by means of the hinges so that the blades will be disposed at an inclination or taper down under the roots of the weed to more positively and effectively cut the same closer to the ground.

In view of the foregoing, it is thought that the operation of the device will be readily understood and in view of the simplicity and practical value, that it will readily commend itself to those skilled in the art.

However, if desired the hitch or drag chain 30 may be provided on either or both sides of the connection ring 31 with rings 32, spaced from the ring 31 a short distance, to hitch or hook the draft animals or whiffletree to in order to shorten the chain or connection on one side or the other, for use in going around a bend that may be in some ditches, or if either end of the device should become stuck in the corresponding bank of the ditch, to shorten the strain on either side and pull it out.

In lieu of the hinge or hinge connection 17 between the side members of the frame, as shown in Fig. 1, the connection illustrated in Fig. 4 may be employed, the same comprising a ball and socket or universal joint or hinge 33, consisting of a ball member 34 received in or engaged by a socket member 35. These members are provided with apertured attaching plates 36 and 37, respectively, for bolting to the opposite sides or frame members, one side being similarly adjustable at the apertures 18 if desired, although this is not generally necessary in this instance. The socket 35 comprises separable or resilient sections connected by a transverse fastener or bolt 38, so as to cause the socket to properly fit the ball member, so that either the ordinary hinge or the ball and socket hinge or universal joint will permit or allow the bars or side members of the frame 10 to close up or spread apart, or rest at any desired angle, as it is thought will be manifest.

Having thus fully described my invention what I claim as new and desire to secure by Letters Patent is:—

1. A bog cutter, grubber and weeder, comprising a V-shaped frame having side members connected for adjustment angularly with respect to each other, said frames having upright cutters, at the ends thereof and a plurality of rotatable cutters along the inner edges thereof in opposed relation, and means for advancing the frame in the direction of the ends thereof provided with the upright cutters.

2. In a ditch weeder and grubber, a pair of elongated side members disposed in forwardly divergent relation and connected at their rear ends for free movement angularly, one with respect to the other, rotatable disk cutters mounted in said side members and having their inner portions exposed for cutting action, said disk cutters being designed to turn during the use thereof, upright members at the forward ends of the side members and having cutting edges at the forward and outer edge portions thereof, connecting means between said upright members and draft means connected to the forward ends of said side members.

3. In a ditch weeder and grubber, a pair of elongated side members disposed in forwardly divergent relation and connected at their rear ends for free movement angularly, one with respect to the other, rotatable disk cutters mounted in said side members and having their inner portions exposed for cutting action, said disk cutters being designed to turn during the use thereof, upright members at the forward ends of the side members and having cutting edges at the forward and outer edge portions thereof, said side members being adjustable toward and away from each other, adjustable connecting means between said side members, and draft means of adjustable width connected to the forward ends of the side members.

4. In a ditch weeder and grubber, a pair of elongated side members disposed in forwardly divergent relation and connected at their rear ends for free movement angularly, one with respect to the other, rotatable disk cutters mounted in said side members and having their inner portions exposed for cutting action, said disk cutters being designed to turn during the use thereof, upright members at the forward ends of the side members and having cutting edges at the forward and outer edge portions thereof, said side members being adjustable toward and away from each other, upright cutting blades at the forward ends of said side members and extending forwardly and outwardly with the cutting edges at the forward edges thereof, hinges connected to said uprights adjacent their upper ends, a connecting member between said uprights and having means for adjustably connecting the inner leaves of the hinges along the ends of the same, a draft bar parallel to said connecting member, connections between the draft bar and the forward ends of the side members, said connections being adjustable along the draft bar and a hitch connected to said bar through the medium of said adjustable connections.

5. In a bog cutter, grubber and ditch cleaner, a V-shaped frame having side members connected at one end of each to the other for adjustment to vary the angular relation therebetween and the inclination or pitch thereof, said side members comprising spaced upper and lower portions, a plurality of spaced cutter disks demountably and rotatably held between said portions and having their inner portions projecting from the inner edges of the plate, and means adjustably connecting the forward ends of the side members and adapted for the attachment of draft means.

6. In a bog cutter, grubber and ditch cleaner, a V-shaped frame having side members connected at one end of each to the other for adjustment to vary the angular relation therebetween and the inclination or pitch thereof, said side members comprising spaced upper and lower plates, a plurality of spaced cutter disks demountably and rotatably held between said plates and having their inner portions projecting from the inner edges of the plates, said side members and plates being relatively flat to dispose the cutting disks in close proximity to the ground surface for cutting action, the front of the frame being open and unobstructed, blades at the forward end of the side members of the frame, and adjustable draft connections at said ends.

7. In a bog cutter, grubber and ditch cleaner, a V-shaped frame having side members connected at one end of each to the other for adjustment to vary the angular relation therebetween and the inclination or pitch thereof, said side members comprising spaced upper and lower plates, a plurality of spaced cutter disks demountably and rotatably held between said plates and having their inner portions projecting from the inner edges of the plate, said side members having upwardly directed forward ends, said upwardly directed portions being twisted to extend in outwardly and forwardly directed planes, and having cutting edges along the vertical forward edges thereof, said frame being adapted to automatically conform to the cross section of a ditch or surface upon which the same is advanced, swiveled connections between the upper ends of the uprights and including a cross member adapted in conjunction with said uprights to bend over and direct the weeds or other growth downwardly and inwardly for cutting action thereon by the disks, and a drag chain constituting a hitch adjustable in width and having connection with the forward ends of the side members at the lower portion of the uprights to leave the front portion of the frame unobstructed, the outer and rear edges of the side members being also unobstructed.

CHARLES ALBERT AMBROSE.